United States Patent
Goyal et al.

(10) Patent No.: US 11,562,186 B2
(45) Date of Patent: Jan. 24, 2023

(54) CAPTURING NETWORK DYNAMICS USING DYNAMIC GRAPH REPRESENTATION LEARNING

(71) Applicant: Siemens Aktiengesellschaft, Munich (DE)

(72) Inventors: Palash Goyal, Los Angeles, CA (US); Sujit Rokka Chhetri, Irvine, CA (US); Arquimedes Martinez Canedo, Plainsboro, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 728 days.

(21) Appl. No.: 16/550,771

(22) Filed: Aug. 26, 2019

(65) Prior Publication Data
US 2020/0074246 A1 Mar. 5, 2020

Related U.S. Application Data

(60) Provisional application No. 62/727,130, filed on Sep. 5, 2018.

(51) Int. Cl.
*G06K 9/62* (2022.01)
*G06N 3/08* (2006.01)

(52) U.S. Cl.
CPC ............. *G06K 9/6296* (2013.01); *G06K 9/62* (2013.01); *G06K 9/6224* (2013.01); *G06K 9/6269* (2013.01); *G06K 9/6274* (2013.01); *G06N 3/08* (2013.01)

(58) Field of Classification Search
CPC ...... G06K 9/6296; G06K 9/62; G06K 9/6224; G06K 9/6269; G06K 9/6274; G06N 3/08
See application file for complete search history.

(56) References Cited

U.S. PATENT DOCUMENTS

| 10,878,309 | B2 * | 12/2020 | Abdelaziz | G06N 3/04 |
| 2013/0144818 | A1 * | 6/2013 | Jebara | G06Q 50/00 706/12 |
| 2019/0122111 | A1 * | 4/2019 | Min | G06N 3/0427 |
| 2020/0074301 | A1 * | 3/2020 | Shang | G06N 5/022 |
| 2021/0081717 | A1 * | 3/2021 | Creed | G06N 5/022 |

OTHER PUBLICATIONS

Li, Taisong, et al. "Deep dynamic network embedding for link prediction." IEEE Access 6 (2018): 29219-29230. (Year: 2018).*

(Continued)

*Primary Examiner* — Fayyaz Alam

(57) ABSTRACT

Methods and systems for dynamic network link prediction include generating a dynamic graph embedding model for capturing temporal patterns of dynamic graphs, each of the graphs being an evolved representation of the dynamic network over time. The dynamic graph embedding model is configured as a neural network including nonlinear layers that learn structural patterns in the dynamic network. A dynamic graph embedding learning by the embedding model is achieved by optimizing a loss function that includes a weighting matrix for weighting reconstruction of observed edges higher than unobserved links. Graph edges representing network links at a future time step are predicted based on parameters of the neural network tuned by optimizing the loss function.

11 Claims, 11 Drawing Sheets

(56) References Cited

OTHER PUBLICATIONS

Goyal, Palash, et al. "Dyngem: Deep embedding method for dynamic graphs." arXiv preprint arXiv:1805.11273 (2018). (Year: 2018).*
Perozzi, B.; Al-Rfou, R.; and Skiena, S.; 2014. Deepwalk: Online learning of social representations. In Proceedings 20th international conference on Knowledge discovery and data mining, 701-710.
Goyal, P.; Sapienza, A.; and Ferrara, E.; 2018. Recommending teammates with deep neural networks. In Proceedings of the 29th on Hypertext and Social Media, 57-61. ACM.
Zhou, L.; Yang, Y.; Ren, X.; Wu, F.; and Zhuang, Y.; 2018. Dynamic Network Embedding by Modelling Triadic Closure Process. In AAAI.
Kipf, T. N., and Welling, M.; 2016; Variational graph autoencoders. arXiv preprint arXiv:1611.07308.
Henaff, M.; Bruna, J.; and LeCun, Y.; 2015. Deep convolutional networks on graph-structured data. arXiv preprint arXiv:1506.05163.
Zhang, Z.; Cui, P.; Pei, J.; Wang, X.; and Zhu, W.; 2017. Timers: Error-bounded svd restart on dynamic networks. arXiv preprint arXiv:1711.09541.
Belkin, M., and Niyogi, P. 2001. "Laplacian eigenmaps and spectral techniques for embedding and clustering" In NIPS, vol. 14, 585-591.
Bruna, J.; Zaremba, W.; Szlam, A.; and LeCun, Y. 2013. Spectral networks and locally connected networks on graphs. arXiv preprint arXiv:1312.6203.
Cao, S.; Lu, W.; and Xu, Q. 2016. Deep neural networks for learning graph representations. In Proceedings of the Thirtieth AAAI Conference on Artificial Intelligence, 1145-1152. AAAI Press.
Freeman, L. C. 2000. Visualizing social networks. Journal of social structure 1(1):4.
Goyal, P.; Kamra, N.; He, X.; and Liu, Y.; May 29, 2018. Dyngem: Deep embedding method for dynamic graphs. In IJCAI International Workshop on Representation Learning for Graphs.
Goyal, P.; Hosseinmardi, H.; Ferrara, E.; and Galstyan, A. 2018. Embedding networks with edge attributes. In Proceedings of the 29th on Hypertext and Social Media, 38-42. ACM.
Brand, M. 2006. Fast low-rank modifications of the thin singular value decomposition. Linear algebra and its applications 415(1):20-30.
Gehrke, J.; Ginsparg, P.; and Kleinberg, J. 2003. Overview of the 2003 kdd cup. ACM SIGKDD Explorations 5(2).
Kingma, Diederik P. et al. "Adam: A Method for Stochastic Optimization" 3rd International Conference for Learning Representations (ICLR), San Diego, 2015, arXiv:1412.6980.
Kipf, Thomas N., "Semi-Supervised Classification With Graph Convolutional Networks"; Published as a conference paper at ICLR 2017.
Pavlopoulos, G. A.;Wegener, A.-L.; and Schneider, R.; 2008. A survey of visualization tools for biological network analysis. Biodata mining 1(1):12.
Li, Taisong et al., Deep Dynamic Network Embedding for Link Prediction, May 25, 2018.
EPO Search Report, European patent application 19 194 869.4, dated Jan. 29, 2020, pp. 1-3.
Ahmed, A. et al., "Distributed large-scale natural graph factorization," In Proceedings of the 22nd international conference on World Wide Web, 37-48, May 2013.
Cao, S., et al., "GraRep: Learning graph representations with global structural information," ISBN 978-1-4503-3794—Jun. 15, 2010, 891-900. Oct. 2015. ACM.
Goyal, P., and Ferrara, E., "Graph embedding techniques, applications, and performance: A survey," Knowledge-Based Systems, arXiv: 17005.02801v4, Dec. 2017.
Wang, Y. J., and Wong, G. Y., "Stochastic blockmodels for directed graphs," Journal of the American Statistical Association 82(397):8-19, Mar. 1987.
Zhu, L. et al., "Scalable temporal latent space inference for link prediction in dynamic social networks," IEEE Transactions on Knowledge and Data Engineering 28(10):2765-2777, 2017.
Tang, J., et al., "Line: Large-scale information network embedding," In Proceedings 24th International Conference on World Wide Web, 1067-1077, 2015.
Theocharidis, A.; Van Dongen, S.; Enright, A.; and Freeman,T.: "Network visualization and analysis of gene expression data using BioLayout Express3d," Nature protocols vol. 4 No. 10:1535-1550, Oct. 2009.
Rumelhart, D. et al.: "Learning representations by back-propagating errors"; in: Nature; vol. 323; pp. 533-536; 1986.
Leskovec et al. "Graphs over Time: Densification Laws, Shrinking Diameters and Possible Explanations" KDD'05, ACM 1-59593-135-X/05/0008, Aug. 21-24, 2005.
Ou, M. et al., "Asymmetric transitivity preserving graph embedding", Proceedings of 22nd ACM SIGKDD international conf. on knowledge discovery and data mining, 1105-1114; 2016.
Wang, D. et al., "Structural deep network embedding," In Proceedings of the 22nd International Conference on Knowledge Discovery and Data Mining, 1225-1234, Aug. 13-17, 2016.
Grover, A. et al., "node2vec: Scalable feature learning for networks," In Proceedings of the 22nd International Conference on Knowledge Discovery and Data Mining, 855-864, Nov. 14, 2016.

* cited by examiner

400

Algorithm 1: dyngraph2vec

Function *dyngraph2vec (Graphs $\mathcal{G} = \{G_1, ..., G_T\}$, Dimension d, Look back lb)*

Generate adjacency matrices $\mathcal{A}$ from $\mathcal{G}$;
  $\vartheta \leftarrow$ RandomInit();
  Set $\mathcal{F} = \{(A_{t_u})\}$ for each $u \in V$, for each $t \in \{1..t\}$;
  for *iter* = 1 ... I do
    $M \leftarrow$ getArchitectureInput($\mathcal{F}$, lb);
    Choose $L$ based on the architecture used;
    $grad \leftarrow \partial L / \partial \vartheta$;
    $\vartheta \leftarrow$ UpdateGradient($\vartheta$, grad);
  $Y \leftarrow$ EncoderForwardPass($G, \vartheta$);
  return $Y$

*FIG. 4*

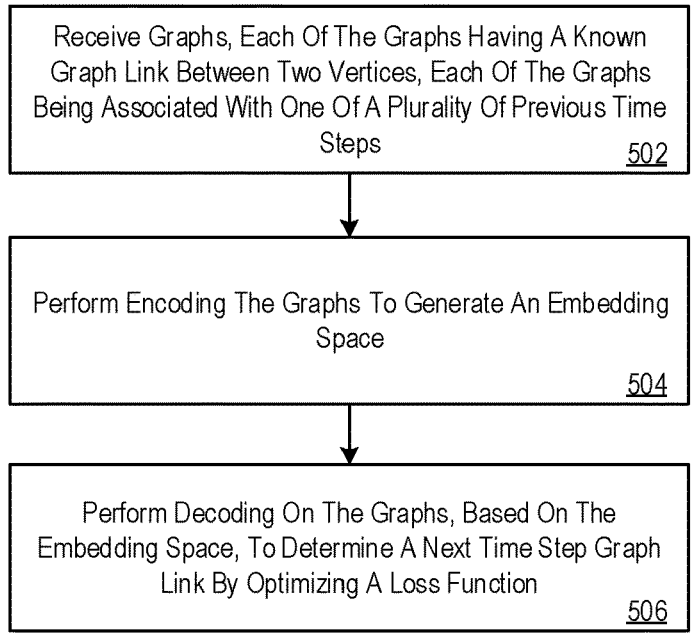

*FIG. 5*

CAPTURING NETWORK DYNAMICS USING DYNAMIC GRAPH REPRESENTATION LEARNING

CROSS-REFERENCE TO RELATED APPLICATIONS

This application claims the benefit of U.S. Provisional Application No. 62/727,130, which was filed on Sep. 5, 2018, the entire disclosure of which is incorporated herein by reference in its entirety.

BACKGROUND

The present invention generally relates to machine learning systems, and more specifically, to capturing network dynamics using dynamic graphic representation learning.

Graphs can be used to represent data in the form of data structures, which can be analyzed using algorithms such as neural networks. Such graphs can include nodes (also called "vertices") connected together by edges. Many real-world problems can be formulated as link predictions in graphs. One such example is link prediction in an author collaboration network, which can be used to predict potential future author collaboration. In another such example, new connections between proteins can be discovered using protein interaction networks. Similarly, in the context of social networking, new social relationships can be predicted. Graph representation learning can be used to obtain such predictions. Such approaches represent each node in the network with a fixed dimensional embedding and map link prediction in the network space to the nearest neighbor search in the embedding space.

SUMMARY

Embodiments of the present invention are directed to a computer-implemented method for link prediction of a dynamic network using dynamic graphic representation learning. A non-limiting example of the computer-implemented method includes generating a dynamic graph embedding model for capturing temporal patterns of dynamic graphs, where each of the graphs are an evolved representation of the dynamic network over time steps for a temporal lookback period and have a set of vertices and edges, the edges representing network links, and the temporal patterns including nonlinear interactions between graph vertices at each time step and across multiple time steps. The dynamic graph embedding model is configured as a neural network including nonlinear layers for learning structural patterns in the dynamic network. The method further includes learning, by the dynamic graph embedding model, a dynamic graph embedding for the temporal lookback period by optimizing a loss function that includes a weighting matrix for weighting reconstruction of observed edges higher than unobserved links. The network embedding is a representation of each of the vertices in a series of low-dimensional vector space. The method further includes predicting edges at a future time step based on parameters of the neural network, where the parameters are tuned by optimizing the loss function.

Embodiments of the present invention are directed to a system. A non-limiting example of the system includes a memory comprising computer readable instructions and a processing device for executing the computer readable instructions for executing steps of link prediction of a dynamic network. A non-limiting example of the executed steps includes generating a dynamic graph embedding model for capturing temporal patterns of dynamic graphs, where each of the graphs are an evolved representation of the dynamic network over time steps for a temporal lookback period and have a set of vertices and edges, the edges representing network links, and the temporal patterns including nonlinear interactions between graph vertices at each time step and across multiple time steps. The dynamic graph embedding model is configured as a neural network including nonlinear layers for learning structural patterns in the dynamic network. The executed steps further include learning, by the dynamic graph embedding model, a dynamic graph embedding for the temporal lookback period by optimizing a loss function that includes a weighting matrix for weighting reconstruction of observed edges higher than unobserved links. The network embedding is a representation of each of the vertices in a series of low-dimensional vector space. The executed steps further include predicting edges at a future time step based on parameters of the neural network, where the parameters are tuned by optimizing the loss function.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts an algorithm for optimizing one of the models of FIGS. 3A-3C according to one or more embodiments described herein;

FIG. 5 depicts a flow diagram of a method for capturing network dynamics using dynamic graphic representation learning according to one or more embodiments described herein;

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

According to aspects described herein, techniques for dynamic graph representation learning are provided, which can be useful for capturing network dynamics such as evolution of network links. Learning graph representations is a fundamental task aimed at capturing various properties of graphs in vector space. The aspects described herein are useful for prediction of a future (next time step) network state, including prediction of new unobserved links.

Figure 1:
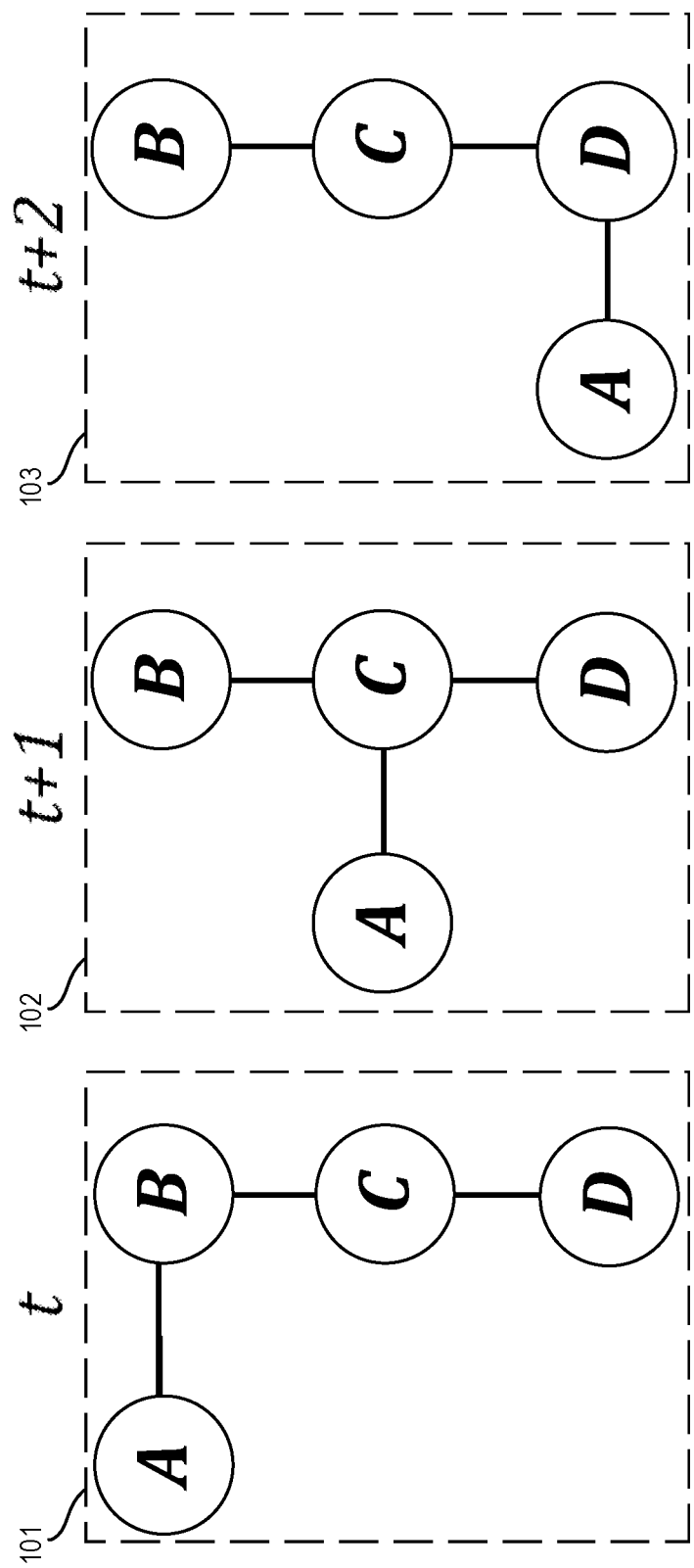
FIG. 1 depicts an example of a network that changes over time, with snapshots taken of the network at times t, t+1, and t+2 respectively.

The present techniques capture underlying network dynamics of evolution. For example, given temporal snapshots of graphs, a representation of nodes at each time step can be learned while capturing the dynamics such that future connections are predicted. Learning such representations is challenging for a number of reasons. First, the temporal patterns may exist over varying period lengths. For example, as shown in FIG. 1, the user A may hold to each friend for a varying length k. Second, different vertices may have different paths. For example, in FIG. 1, user A may break ties with friends whereas other users continue with their ties.

Some approaches exist for learning such representations for static networks. Conventional approaches to graph representation learning primarily focused on static graphs of two types: (1) aggregated, with all edges until time T, and (2) snapshot, with edges at the current time step t. These models learn latent representations of the static graph and use them to predict missing links. However, conventional approaches utilize simplified assumptions to overcome the described challenges associated with learning representations, such as assuming that patterns are of short duration (i.e., length 2) and only considering the previous time step graph to predict new length. Further, conventional approaches assume that the changes are smooth and use regularization to disallow rapid changes.

Real networks often have complex dynamics which govern their evolution, and the simplified approaches and assumptions of the prior art are inadequate for accurate dynamic graph representation learning.

As an example, consider a social network as depicted in FIG. 1. In particular, FIG. 1 depicts an example of a network that changes over time, with snapshots 101, 102, 103 taken of the network at times t, t+1, and t+2 respectively. At time t as shown in snapshot 101, user A (denoted by node "A") has a relationship with user B (denoted by node "B") and user C (denoted by node "C") has a relationship with user B and user D (denoted by node "D"). At time t+1 as shown in snapshot 102, user A moves from one friend (i.e., user B) to another friend (i.e., user C) in such a way that only a friend-of-a-friend is followed and making sure not to befriend an old friend. Conventional approaches to graph representation learning that are based on static networks can only observe the network at time t+1 and cannot ascertain if A will befriend user B or D in the next step. Instead, the techniques for dynamic graphic representation learning described herein observe multiple snapshots 101, 102, 103, which capture the network dynamics and predict the user A's connection to user D with high certainty as shown in the snapshot 103 in which user A has terminated its relationship with user C and has formed a relationship with user D.

As can be seen from this example, real-world networks evolve over time and have varying dynamics. Capturing such evolution enables predicting the properties of new unseen networks, for example. To understand how network dynamics affect the prediction performance, an embedding approach is proposed herein, which learns the structure of evolution in dynamic graphs and can predict unobserved links with higher precision than existing approaches. In particular, embodiments described herein learn the temporal transitions in the network using a deep architecture composed of dense and recurrent layers. Such embodiments improve the quality of embedding and yield better performance in link prediction than prior art approaches. In an embodiment, a deep learning model is described, which takes multiple previous graphs as input and outputs a predicted graph for a next time step. This captures highly non-linear interactions between nodes at each time step and across multiple time steps. The embedding thus learned is predictive of new links between the nodes.

Turning now to embodiments presently described, a model is provided which overcomes the above challenges. In particular, the present techniques use multiple non-linear layers to learn structural patterns in a network. Furthermore, the present techniques use recurrent layers to learn the temporal transitions in a network. A lookback parameter l of the recurrent layers controls the length of the temporal patterns learned. Thus, the present techniques, as compared to conventional approaches to dynamic graph representation learning, utilize a deep model with recurrent layers, which can capture temporal dynamics of the networks and significantly outperform conventional approaches on link prediction. It should be appreciated that the present techniques focus primarily on link prediction rather than node classification and can operate on both aggregated and snapshot temporal graphs.

Figure 2:
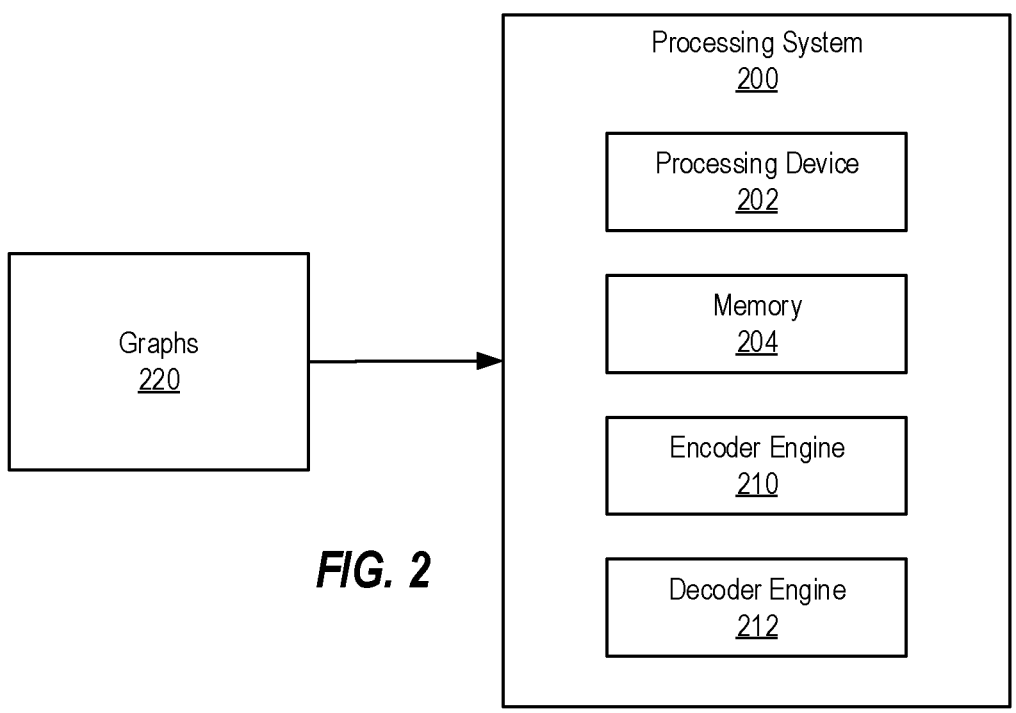
FIG. 2 depicts a processing system for dynamic graph representation learning according to one or more embodiments described herein.

FIG. 2 depicts a processing system 200 for dynamic graph representation learning according to one or more embodiments described herein. The processing system includes a processing device 202, a memory 204, an encoder engine 210, and a decoder engine 212. The processing system receives graphs 220, which can be one or more of the graphs 302, 322, 342 of FIGS. 3A, 3B, 3C respectively.

The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., the memory 204) can store program instructions that when executed by the processing device 202 implement the engines described herein. Other engines can also be utilized to include other features and functionality described in other examples herein.

Aspects of the present disclosure can utilize machine learning functionality to accomplish the various operations described herein. For example, the combination of the encoder engine 210 and the decoder engine 212 is an example of an autoencoder, which is a type of artificial neural network capable of performing feature learning. The autoencoder learns to predict graph links, which are links or connections between nodes/vertices of a graph. More particularly, the encoder engine 210 maps graphs (inputs) into a code in an embedding space that is used to represent the input; the decoder engine 212 maps the code from the embedding space to generate graphs that include a next time step graph link between nodes/vertices.

More specifically, the present techniques can incorporate and utilize rule-based decision making and AI reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used to determine surrogate computer program usage. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 3A:
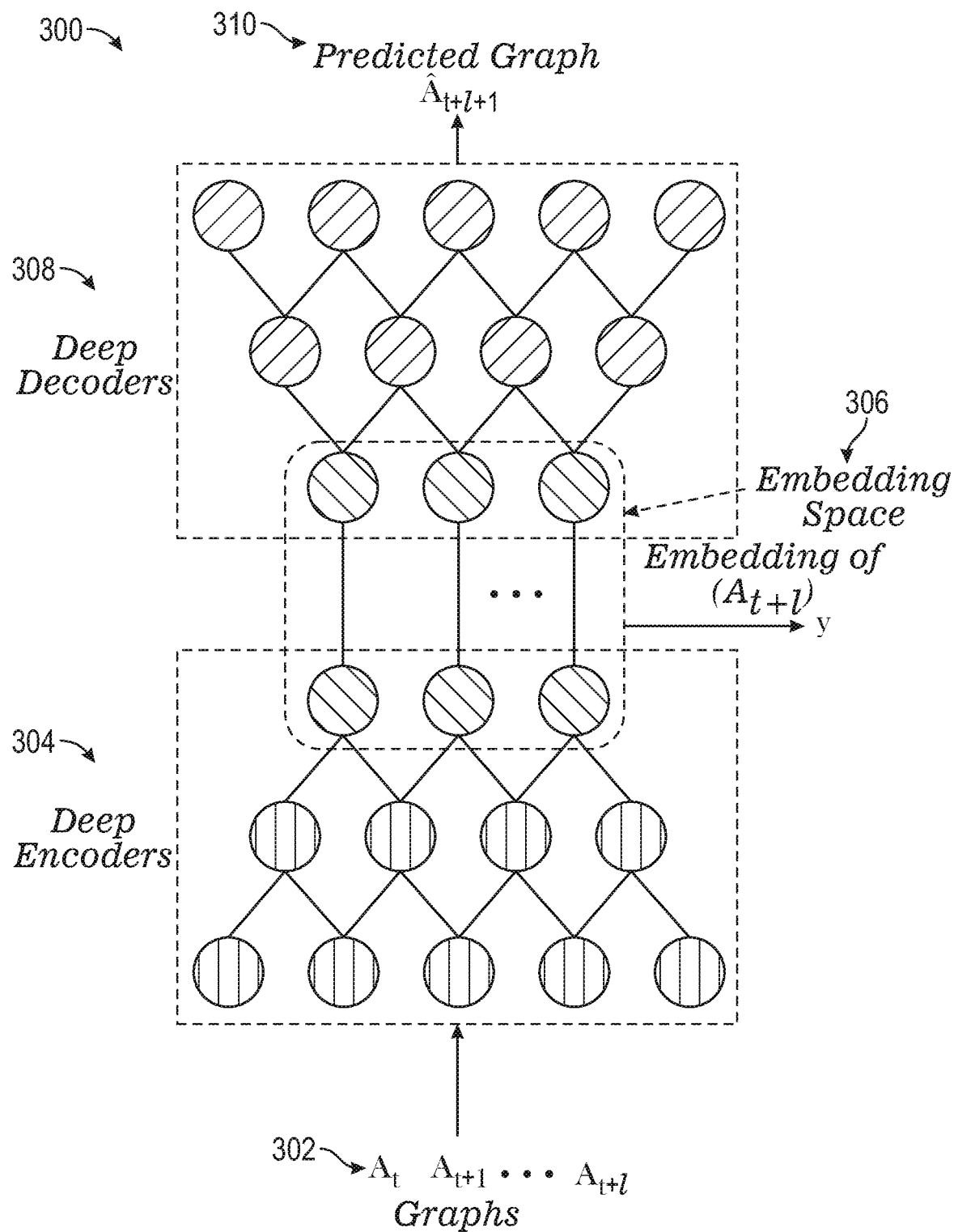
FIG. 3A depicts a dynamic graph to vector autoencoder model according to one or more embodiments described herein.
Figure 3B:
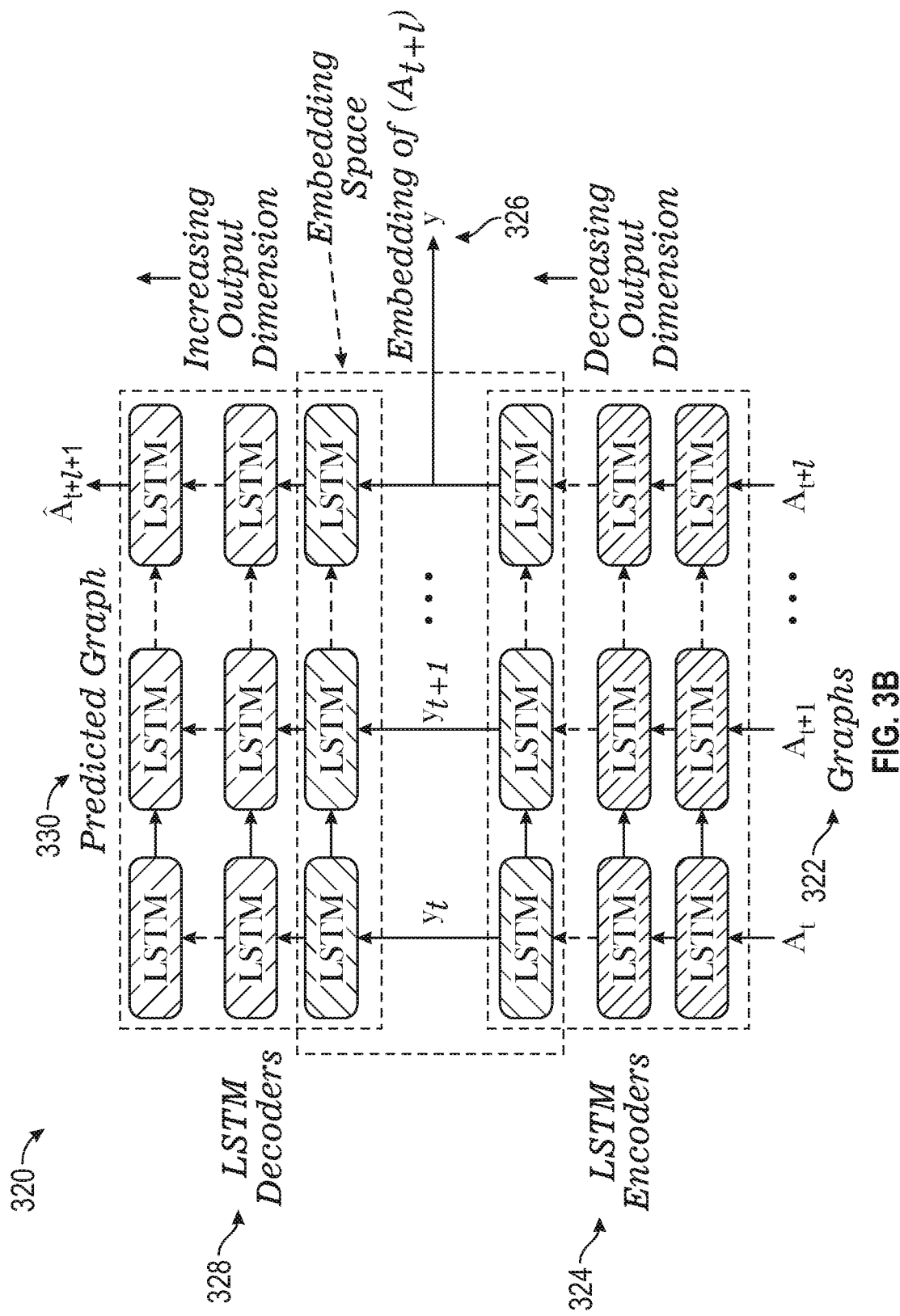
FIG. 3B depicts a dynamic graph to vector recurrent neural network model according to one or more embodiments described herein.
Figure 3C:
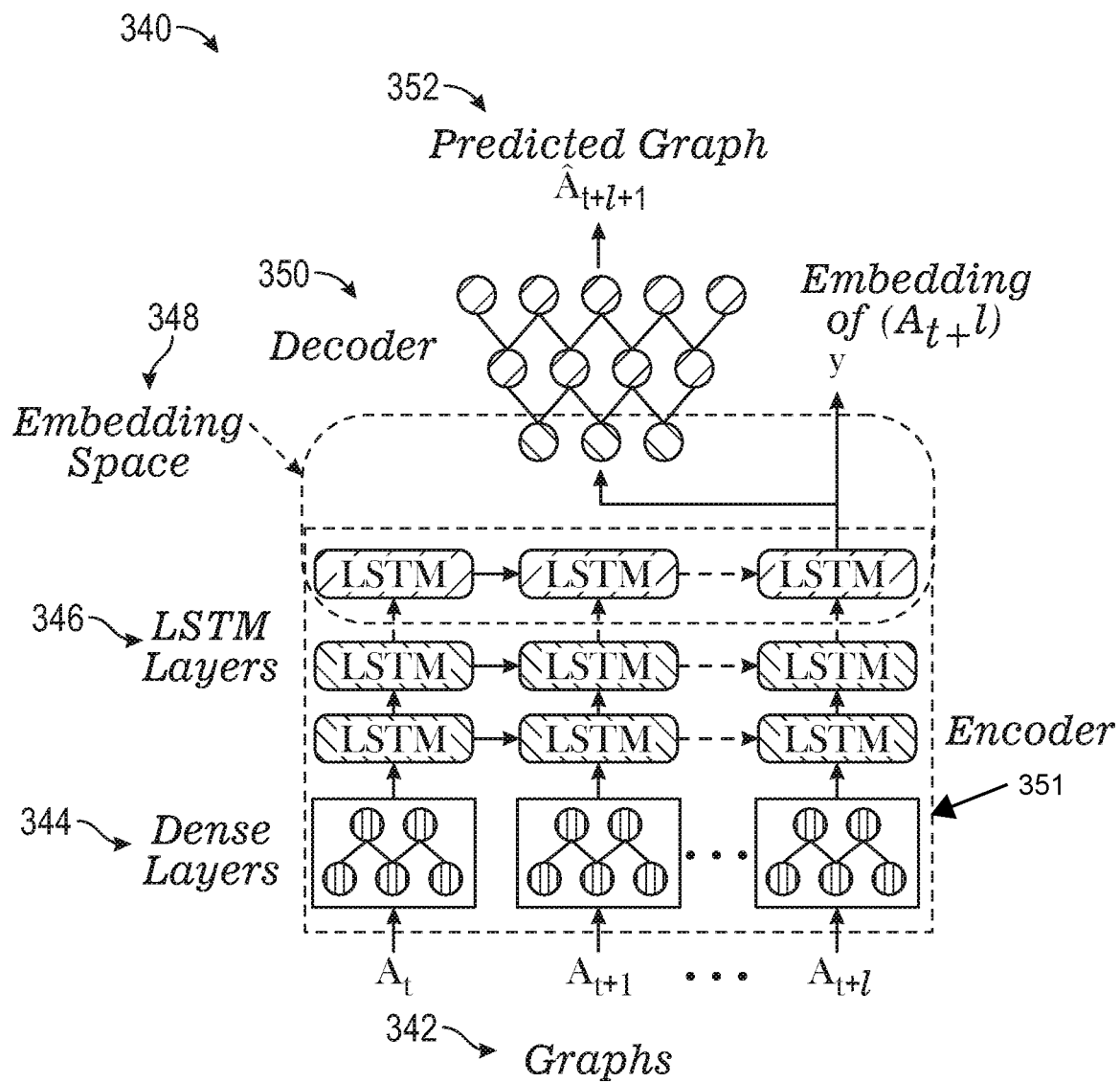
FIG. 3C depicts a dynamic graph to vector autoencoder recurrent neural network model according to one or more embodiments described herein.

The features and functionality of the encoder engine 210 and the decoder engine 212 (collectively referred to as an "autoencoder") are further described with respect to the models described in FIGS. 3A-3C.

Consider a weighted graph G(V,E), with V and E as the set of vertices (or "nodes") and edges respectively. An adjacency matrix A of graph G is defined such that for an edge (ij) ∈ E, $A_{ij}$ denotes its weight, else $A_{ij}$=0. An evolution of graph G is denoted as $\mathcal{G}$ ={$G_1, \ldots, G_T$}, where $G_t$ represents the state of the graph at time t. The dynamic graph representation learning problem can be defined as follows. Given a graph evolution $\mathcal{G}$, it is desired to represent each node v in a series of low-dimensional vector space $y_{v_1}, \ldots y_{v_t}$, (i.e., embedding space) where $y_{v_t}$ is the embedding function of node v at time t, by learning mappings $f_t$: {$V_1, \ldots, V_t$, $E_1, \ldots E_t$}→$\mathbb{R}^d$ and $y_{v_i}$=$f_i(v_1, \ldots, v_i, E_1, \ldots, E_i)$ such that $y_{v_i}$ can capture temporal patterns required to predict $y_{v_{i+1}}$. In other words, the embedding function at each time step uses information from graph evolution $\mathcal{G}$ to capture network dynamics and can thus predict links with higher precision than conventional approaches.

The processing system 200 uses a deep learning model that takes as input a set of previous graphs, each being associated with previous time step, and generates as output the graph at the next time step, thus capturing non-linear interactions between vertices at each time step and across multiple time steps. Embedding values capture the temporal evolution of links, which allows the next time step graph link to be predicted. The deep learning model learns the embedding for the lookback period by optimizing a loss function that includes a weighting matrix for weighting reconstruction of observed edges higher than unobserved links. For example, a loss function L for the lookback period at time step t+l to be optimized can be represented by the following expression:

$$L_{t+1} = \|(\hat{A}_{t+l+1} - A_{t+l+1}) \odot \mathcal{B}\|_F^2, \quad (1)$$
$$= \|(f(A_t, \ldots, A_{t+l}) - A_{t+l+1}) \odot \mathcal{B}\|_F^2.$$

where weighting matrix $\mathcal{B}$ is used to weight the reconstruction of observed edges higher than unobserved links, and operator ⊙ represents element-wise product. Here, $\mathcal{B}_{ij}$=β for (i,j) ∈ $E_{t+l+1}$, else 1, where β is a hyperparameter controlling the weight of penalizing observed edges. According to an aspect, the embedding at time step t+l is a function of the graphs at time steps t, t+1, t+l, where l is the temporal lookback value. Incorrect reconstruction of edges at time t+l+1 is penalized by using the embedding at time step t+l. Minimizing this loss function, which is described in more detail herein, enforces network parameters to be tuned such that the deep learning model can capture evolving patterns relations between nodes to predict the network links (edges E) at a future time step, including edges for unobserved network links.

FIGS. 3A, 3B, and 3C respectively depict three variations of a deep learning model for dynamic graph representation learning according to one or more embodiments described herein. Particularly, FIG. 3A depicts a dynamic graph to vector autoencoder model 300 according to one or more embodiments described herein. FIG. 3B depicts a dynamic graph to vector recurrent neural network model 320 according to one or more embodiments described herein. FIG. 3C depicts a dynamic graph to vector autoencoder recurrent neural network model 340 according to one or more embodiments described herein.

The models of FIGS. 3A-3C differ in the formulation of the function $f(.)$. In particular, the model 300 of FIG. 3A extends the autoencoders to the dynamic setting in a straightforward manner, thereby overcoming the limitations of capturing temporal information and the high number of model parameters through the presently described models 320, 340 of FIGS. 3B and 3C respectively. The models 300, 320, 340 of FIGS. 3A, 3B, 3C respectively are further described with reference to the components of FIG. 2; however, it should be appreciated that such reference is merely illustrative and is not intended to be limiting.

One technique for extending the autoencoders conventionally used to embed static graphs to temporal graphs is to add information about previous 1 graphs as input to the autoencoder. This example is depicted in FIG. 3A. In particular, the model 300 of FIG. 3A thus uses multiple fully connected layers to model the interconnection of nodes within and across time. Graphs 302, each associated with a different time, $A_t, A_{t+1}, \ldots, A_{t+l}$, are received by deep encoders 304 (e.g., the encoder engine 210 of FIG. 2). The deep encoders 304 generate an embedding space 306 of the graph $A_{t+l}$ as follows:

Concretely, for a node u with neighborhood vector set $u_{1 \ldots t} = [a_{u_t}, \ldots, a_{u_{t+l}}]$, the hidden low-dimensional vector representation of the first layer is learned as:

$$y_{u_t}^{(1)} = f_a(W_{AE}^{(1)} u_{1 \ldots t} + b^{(1)}),$$

where $f_a$ is the activation function, weight matrix $W_{AE}^{(1)} \in \mathbb{R}^{d^{(1)} \times nl}$, $d^{(1)}$ the dimensions of representation learned by the first layer, n is the number of nodes in the graph, l is the lookback value, and b is a bias value for the first layer. The representation of the $k^{th}$ layer is defined as:

$$y_{u_t}^{(k)} = f_a(W_{AE}^{(k)} y_{u_t}^{(k-1)} + b^{(k)}).$$

Deep decoders 308 (e.g., the decoder engine 212) use the embedding space 306 to generate a predicted graph 310 (denoted $A_{t+l+1}$) having predicted graph links at a next time t+l+1 (i.e., next time step graph links) relative to the time t+l.

It should be appreciated that the model 300 of FIG. 3A has $O(nld^{(1)})$ parameters. However, as most real-world graphs are sparse, learning the parameters can be challenging. Accordingly, to reduce the number of model parameters and achieve a more efficient temporal learning, two additional models 320, 340 are described and depicted in FIGS. 3B and 3C respectively.

The model 320 uses sparsely connected long short term memory (LSTM) networks to form LSTM encoders 324 (i.e., the encoder engine 210) to learn the embedding space 326, such as for $A_{t+l}$, based on graphs 322. Each of the graphs 322 is associated with a different time, $A_t, A_{t+1}, \ldots, A_{t+l}$, of various previous time steps. The model 320 uses LSTM decoders 328 (i.e., the decoder engine 212) to generate a predicted graph 330 (denoted $\hat{A}_{t+l+1}$) having predicted graph links at a next time t+l+1 (i.e., next time step graph links) relative to the time t+l.

LSTM is a type of recurrent neural network capable of handling long-term dependency problems. In dynamic graphs, there can be long-term dependencies, which may not be captured by conventional autoencoders. The hidden state representation of a single LSTM network is defined as:

$$y_{u_t}^{(1)} = o_{u_t}^{(t)} * \tan h(c_{u_t}^{(1)})$$

$$o_{u_t}^{(1)} = \sigma_{u_t}(W_{RNN}^{(1)}[y_{u_{t-1}}^{(1)}, u_{1 \ldots t}] + b_o^{(1)})$$

$$C_{u_t}^{(1)} f_{u_t}^{(1)} * C_{u_{t-1}}^{(1)} + i_{u_t}^{(1)} * \tilde{C}_{u_t}^{(1)}$$

$$\tilde{C}_{u_t}^{(1)} = \tan h(W_c^{(1)} \cdot [y_{u_{t-1}}^{(1)}, u_{1 \ldots t} + b_c^{(1)}])$$

$$i_{u_t}^{(1)} = \sigma(W_i^{(1)} \cdot [y_{u_{t-1}}^{(1)}, u_{1 \ldots t}] + b_i^{(1)})$$

$$f_{u_t}^{(1)} = \sigma(W_f^{(1)} \cdot [y_{u_{t-1}}^{(1)}, u_{1 \ldots t} + b_f^{(1)}])$$

where $C_{u_t}$ represents the cell states of LSTM, $f_{u_t}$ is the value to trigger the forget gate, $o_{u_t}$ is the value to trigger the output gate, just represents the value to trigger the update gate of the LSTM, $\tilde{C}_{u_t}$ represents the new estimated candidate state, W represents a weight matrix, and b represents the biases. According to an aspect, as shown in FIG. 3C, there can be t+l LSTM networks 324 connected in the first layer, each LSTM network connected to a respective input graph of the time series t, t+1, . . . , t+l, where the cell states and hidden representation are passed in a chain from t+l to t LSTM networks. The representation of the $k^{th}$ layer is then given as follows:

$$y_{u_t}^{(k)} = o_{u_t}^{(k)} * \tan h(C_{u_t}^{(k)})$$

$$o_{u_t}^{(k)} = \sigma_{u_t}(W_{RNN}^{(k)}[y_{u_{t-1}}^{(k)}, y_{u_t}^{(k-1)}] + b_o^{(k)}).$$

As layers of the LSTM encoders 324 approach the embedding space 326, the output dimension decreases. Conversely, as the layers of the LSTM decoders 328 approach the predicted graph, the output dimension increases.

One problem that can occur with passing a sparse neighborhood vector $u_{1 \ldots t} = [a_{u_t}, \ldots, a_{u_{t+l}}]$ of node u to the LSTM network is that the LSTM model parameters (such as the number of memory cells, number of input units, output units, etc.) needed to learn a low dimension representation become large. Rather, the LSTM network may be able to better learn the temporal representation if the sparse neighborhood vector is reduced to a low dimension representation. To achieve this, the present techniques present an additional model 340 of FIG. 3C, configured as an autoencoder-recurrent neural network combination (i.e., a combination of models 300 and 320). In this example, instead of passing the sparse neighborhood vector to the embedding space, the model 340 uses an encoder 351 having fully connected dense layers 344 to initially acquire hidden low dimensional vector representation of the graphs 342 (each associated with a different time, $A_t, A_{t+i}, \ldots, A_{t+l}$) given as follows:

$$y_{u_t}^{(p)} = f_a(W_{AERNN}^{(p)} y_{u_t}^{(p-1)} + b^{(p)}).$$

where p represents the output layer of the fully connected dense layers 344. This representation is then passed to the LSTM networks in the LSTM layers 346, which generate a hidden low-dimensional vector representation in the embedding space 348. The hidden representation is then passed to a fully connected decoder 350, which generates predicted graphs 352 (denoted $\hat{A}_{t+l+1}$) having predicted graph links at a next time t+l+1 (i.e., next time step graph links) relative to the time t+l.

Each of the models 300, 320, 340 can be used to perform encoding of the graphs to generate an embedding space and to perform decoding on the graphs, based on the embedding space, to determine a next time step graph link. The decoding is achieved by optimizing a loss function as described above. More particularly, the loss function defined herein is optimized to determine optimal model parameters. Applying a gradient with respect to decoder weights from the loss function L described above can be represented by the following expression:

$$\frac{\partial L_t}{\partial W_*^{(K)}} = \left[2(\hat{A}_{t+1} - A_{t+1}) \odot \mathcal{B}\right]\left[\frac{\partial f_a(Y^{(K-1)}W_*^{(K)} + b^{(K)})}{\partial W_*^{(K)}}\right],$$

where $W*^{(K)}$ is the weight matrix of the penultimate layer for each of the models 300, 320, 340. For each individual model 300, 320, 340, the gradients are back propagated based on neural units to obtain the derivatives for the previous layers of the respective model. For the LSTM based model 320, 340, back propagation through time is performed to update the weights of the LSTM networks. After obtaining the derivatives, the respective model 300, 320, 340 is optimized using stochastic gradient descent (SGD) with Adaptive Moment Estimation (Adam). An example of such an algorithm is depicted in algorithm 400, shown in FIG. 4.

FIG. 5 depicts a flow diagram of a computer-implemented method 500 for capturing network dynamics using dynamic graphic representation learning according to one or more embodiments described herein. The method 500 can be performed by any suitable processing system (e.g., the processing system 200 of FIG. 2 or the processing system 700 of FIG. 7), by any suitable processing device (e.g., the processing device 202 of FIG. 2 or the processor(s) 721 of FIG. 7), or by any suitable combinations thereof.

At block 502, the encoder engine 210 receives graphs (e.g., the graphs 220, the graphs 302, the graphs 322, the graphs 342, etc.). Each of the graphs has a known graph link between two vertices, and each of the graphs is associated with one of a plurality of previous time steps. These previous time steps are also referred to as "lookback" time steps. Thus, the previous time steps are separated by the temporal lookback value l.

At block 504, the encoder engine 210 performs encoding of the graphs to generate an embedding space (e.g., the embedding space 306, the embedding space 326, the embedding space 348). The encoder engine 210, as described herein, can utilize long short term memory in some examples. In some examples, the encoding is performed by generating a low dimensional vector representation of the graphs and then generating the embedding space using long short term memory as described herein.

At block 506, the decoder engine 212 uses the embedding space to perform decoding on the graphs to determine a next time step graph link. The decoding is performed by optimizing a loss function as described herein. In examples, the two vertices are vertices of a plurality of vertices, and the next time step graph link is between one of the two vertices and another vertex of the plurality of vertices. The decoder engine 212, as described herein, can utilize long short term memory in some examples. The next time step graph link is associated with a time subsequent to the plurality of previous time steps. That is, the next time step graph link is associated with a graph that is predicted beyond the time steps of the received graphs.

Additional processes also may be included. For example, the method 500 can include generating a predicted graph (e.g., the predicted graph 310, the predicted graph 330, the predicted graph 352, etc.) that includes the next time step graph link. It should be understood that the processes depicted in FIG. 5 represent illustrations, and that other processes may be added or existing processes may be removed, modified, or rearranged without departing from the scope of the present disclosure.

The embodiments of the models 300, 320, 340 provide advantages over prior static and dynamic graph embedding methods. As an example, the performance of the embodiments of the models 300, 320, 340 were evaluated against real-world datasets and a synthetic dataset. The datasets used and the baselines established for comparison are now described, along with evaluation metrics and parameter settings associated therewith.

The datasets assumed that the models 300, 320, 340 are aware of all the nodes in the graphs and that no new nodes are introduced in subsequent time steps. However, the techniques described herein are not so limited. The links between the existing (known) nodes change with a certain temporal pattern. The datasets used for evaluation are described in the following Table 1:

TABLE 1

Dataset Statistics

| Name | SBM | Hep-th | AS |
|---|---|---|---|
| Nodes n | 1000 | 150-14446 | 7716 |
| Edges m | 56016 | 268-48274 | 487-26467 |
| Time steps T | 10 | 136 | 733 |

"SBM" stands for stochastic block model. In order to test the performance of various static and dynamic graph embedding models, synthetic SBM data was generated with two communities and a total of 1000 nodes. The cross-block connectivity probability is 0.01 and in-block connectivity probability is set to 0.1. One of the communities is continuously diminished by migrating the 10-20 nodes to the other community. A total of 10 dynamic graphs are generated for the evaluation. Since SBM is a synthetic dataset, there is no notion of time steps.

"Hep-th" stands for high energy physics theory conference. This is a real-world data set taken from a collaboration graph of authors in the High Energy Physics Theory conference. It is used to test the dynamic graph embedding models described herein (see, e.g., the models 300, 320, 340). The original data set contains abstracts of papers in high energy physics theory conference in the period from January 1993 to April 2003. Hence, the resolution of the time step is one month. This graph is aggregated over the months. For evaluation purposes, the last 50 snapshots of this data are considered. From this dataset, 2000 nodes are sampled for training and testing the presently described models 300, 320, 340.

"AS" stands for autonomous systems. This is also a real-world dataset, which is taken from a communication network of who-talk-to-whom from the Border Gateway Protocol (BGP) logs. The dataset contains 733 instances spanning from Nov. 8, 1997, to Jan. 2, 2000. Hence, the resolution of time step for the AS dataset is one month. However, they are snapshots of each month instead of an aggregation as in the Hep-th dataset. For evaluation purposes, a subset of this dataset which contains the last 50 snapshots is considered. From this dataset, 2000 nodes are sampled for training and testing the presently described models 300, 320, 340.

Using the datasets thus described, the models 300, 320, 340 are compared against the following conventional models: optimal singular value decomposition (OptimalSVD), incremental singular value decomposition (IncSVD), rerun singular value decomposition (RerunSVD), dynamic embedding using dynamic triad closure processes (dynamicTriad), and deep embedding method for dynamic graphs (dynGEM). It should be appreciated that the models 300, 320, 340 are also referred to, respectively, as dynamic graph to vector autoencoder (dyngraph2 vecAE), dynamic graph to vector recurrent neural network (dyngraph2 vecRNN), and dynamic graph to vector autoencoder recurrent neural network (dyngraph2 vecAERNN).

The models 300, 320, 340, and the conventional models, are evaluated on link prediction at time step t+l by using all graphs from time step t+1 until the time step t using the metric mean average precision (MAP). The term precision@k is the fraction of correct predictions in the top k predictions and is defined as $$P@k = \frac{|E_{pred}(k) \cap E_{gt}|}{k}$$

where $E_{pred}$ and $E_{gt}$ are the predicted and ground truth edges respectively. MAP averages the precision over the nodes and can be written as:

$$\frac{\sum_i AP(i)}{|V|}$$

where $$AP(i) = \frac{\sum_k \text{precision}@k(i) \cdot \mathbb{1}\{E_{pred_i}(k) \in E_{gt_i}\}}{|\{k : E_{pred_i}(k) \in E_{gt_i}\}|}$$

and $$\text{precision}@k(i) = \frac{|E_{pred_i}(1:k) \cap E_{gt_i}|}{k}$$

P@k values are used to test the top predictions made by each of the tested models. MAP values are more robust and average the predictions for the nodes; high MAP values imply that the model can make good predictions for most nodes.

The performance results of the various convention models and the models 300, 320, 340 of embodiments presently described for link prediction on the different datasets described herein are now presented. The models are trained on graphs from time step t to t+l where l is the lookback of the model, and the links of the graph are predicted at time step t+l+1. The lookback l is a model hyperparameter. For an evolving graph with T steps, the above prediction is performed from T/2 to T and the average MAP of link prediction is calculated. The performance of models, when an increasing length of the graph sequence is provided in the training data, are also presented. Unless explicitly mentioned, for the models that utilize recurrent neural networks, a lookback value of 3 is used for the training and testing described herein.

Figure 6A:
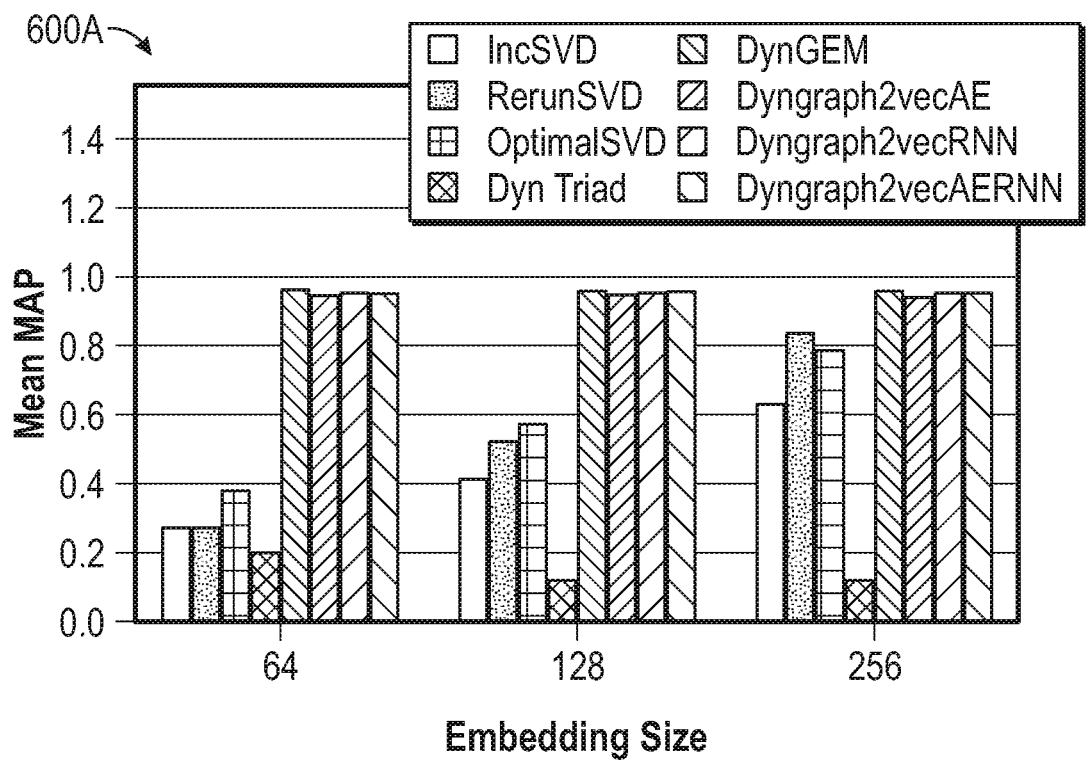
FIGS. 6A, 6B, and 6C depict plots of mean average precision plotted against embedding size for various dynamic graph encoding models, including the models of FIGS. 3A-3C, according to one or more embodiments described herein.

FIG. 6A depicts a plot 600A of the MAP values for the various models with the SBM dataset with a diminishing community. The MAP values shown are for link prediction with embedding sizes 64, 128 and 256. This figure shows that the model 300 (dyngraph2 vecAE), the model 320 (dyngraph2 vecRNN), and the model 340 (dyngraph2 vecAERNN) each have higher MAP values compared to the rest of the baselines except for dynGEM. This is due to the fact that dynGEM also generates the embedding of the graph at snapshot t+1 using the graph at snapshot t. Since in the SBM dataset the node-migration criteria are introduced only one time step earlier, the dynGEM node embedding technique is able to capture these dynamics. However, the proposed dyngraph2 vec methods also achieve average MAP values within ±1.5% of the MAP values achieved by dynGEM. It should be appreciated that the MAP values of SVD based methods increase as the embedding size increases. However, this is not the case for dynTriad.

Figure 6B:
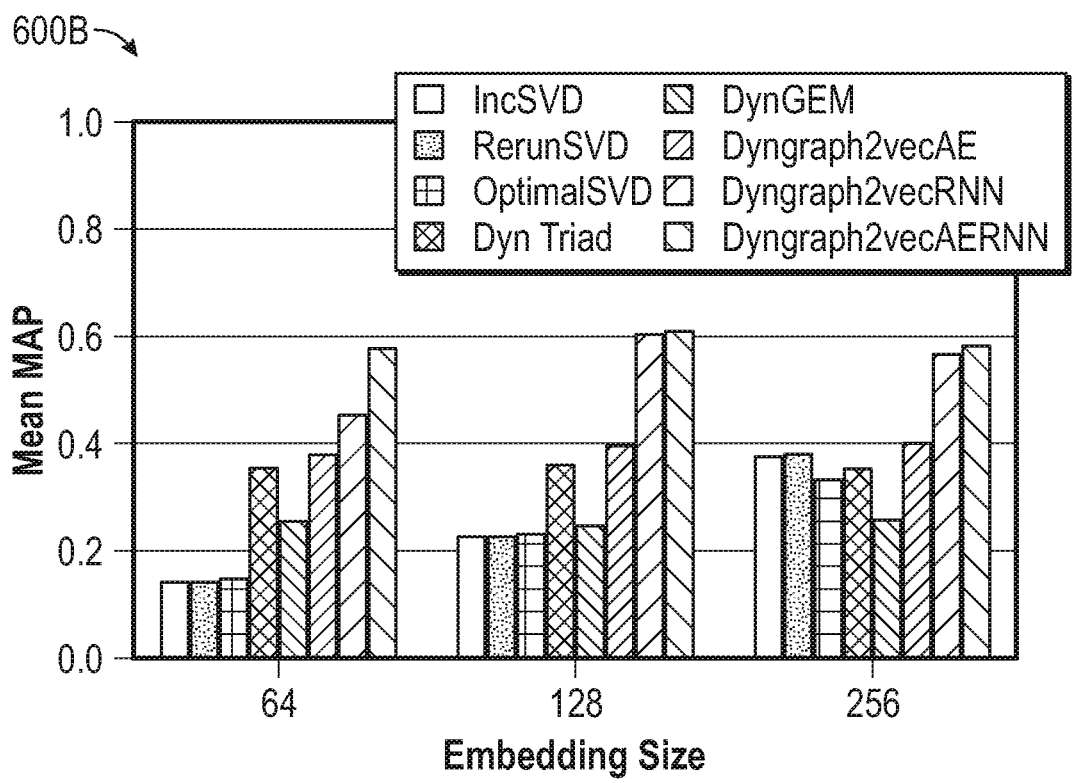

FIG. 6B depicts a plot 600B of the MAP values for the various models with the Hep-th dataset. As shown, the presently described models 300, 320, 340 outperform the other state-of-the-art static and dynamic models. Among the disclosed models 300, 320, 340, dyngraph2 vecAERNN has the highest MAP values, followed by dyngraph2 vecRNN and dyngraph2 vecAE, respectively. The dynamicTriad is able to perform better than the SVD based models. It should be appreciated that dynGEM is not able to have higher MAP values than the dyngraph2 vec models 300, 320, 340 in the Hep-th dataset. Since dyngraph2 vec utilizes not only t−1 time step but also t−l−1 time step to predict the link for the time step t, it has higher performance compared to other state-of-the-art models.

Figure 6C:
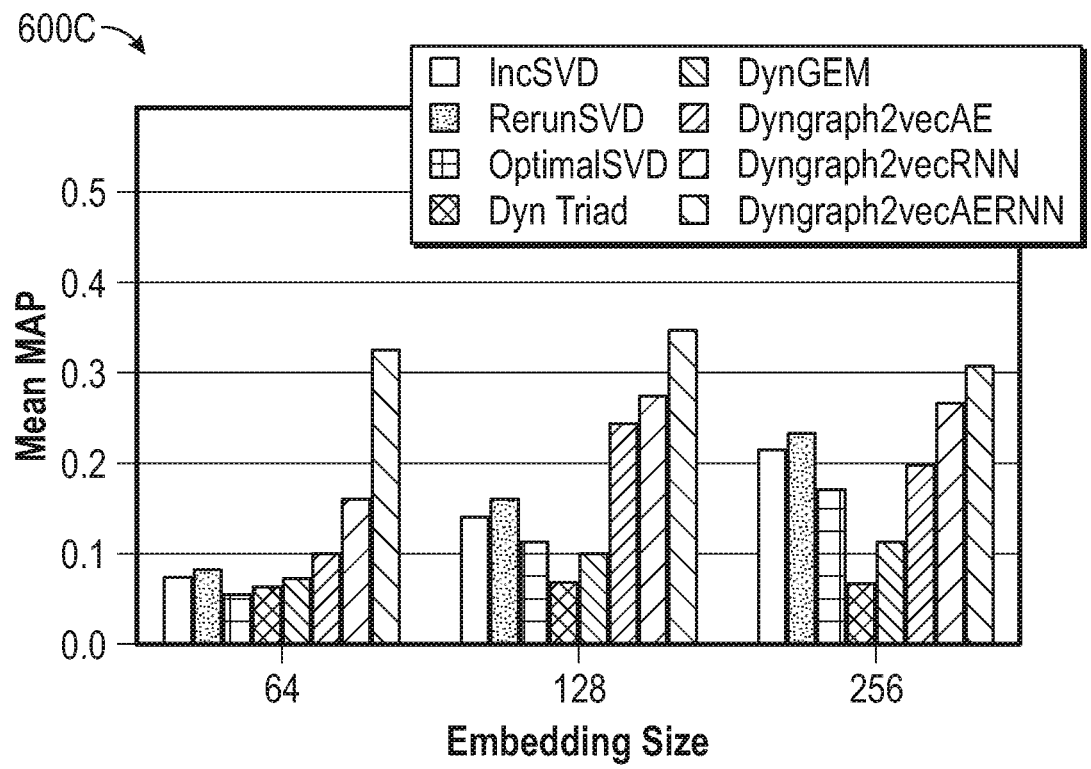

FIG. 6C depicts a plot 600C of the MAP values for the various models with the AS dataset. The model 340 (dyngraph2 vecAERNN) outperforms all the state-of-the-art models. The model with the second-highest MAP score is dyngraph2 vecRNN. However, dyngraph2 vecAE has a higher MAP only with a lower embedding of size 64. SVD methods are able to improve their MAP values by increasing the embedding size. However, they are not able to outperform the dyngraph2 vec models 300, 320, 340.

The summary of MAP values for different embedding sizes (i.e., 64, 128, and 256) for different datasets is presented in the following table:

TABLE 2

Average MAP values over different embedding sizes.

| Method | Average MAP | | |
|---|---|---|---|
| | SBM | Hep-th | AS |
| IncrementalSVD | 0.4421 | 0.2518 | 0.1452 |
| rerunSVD | 0.5474 | 0.2541 | 0.1607 |
| optimalSVD | 0.5831 | 0.2419 | 0.1152 |
| dynamicTriad | 0.1509 | 0.3606 | 0.0677 |
| dynGEM | 0.9648 | 0.2587 | 0.0975 |
| dyngraph2vecAE (lb = 3) | 0.9500 | 0.3951 | 0.1825 |
| dyngraph2vecAE (lb = 5) | — | 0.512 | 0.2800 |
| dyngraph2vecRNN (lb = 3) | 0.9567 | 0.5451 | 0.2350 |
| dyngraph2vecRNN | — | 0.7290 (lb = 8) | 0.313 (lb = 10) |
| dyngraph2vecAERNN (lb = 3) | 0.9581 | 0.5952 | 0.3274 |
| dyngraph2vecAERNN | — | 0.739 (lb = 8) | 0.3801 (lb = 10) | lb = Lookback value

The top three highest MAP values are highlighted in bold. For the synthetic SBM dataset, the top three models with the highest MAP values are dynGEM, dyngraph2 VecAERNN (i.e., the model 340), and dyngraph2 vecRNN (i.e., the model 320), respectively. Since the changing pattern for the SBM dataset is introduced only at timestep t−1, dynGEM is able to better predict the links. The model architecture of dynGEM and dyngraph2 vecAE models differ only on what data are fed to train the model. In dyngraph2 vecAE, more data is fed into the model depending on the size of the lookback. The lookback size increases the model complexity. Since the SBM dataset does not have temporal patterns evolving for more than one time step, the dyngraph2 vec models (i.e., the models 300, 320, 340) achieve at least comparable results to dynGEM.

For the Hep-th dataset, the top three models with the highest MAP values are dyngraph2 VecAERNN, dyngraph2

VecRNN, and dyngraph2 VecAE, respectively. In fact, compared to the state-of-the-art algorithm dynamicTriad, the presently disclosed models dyngraph2 VecAERNN (with lookback=8), dyngraph2 VecRNN (with lookback=8)), and dyngraph2 VecAE (with lookback=5) obtain ≈105%, ≈102%, and ≈42% higher average MAP values, respectively.

For the AS dataset, the top three models with highest the MAP values are dyngraph2 VecAERNN, dyngraph2 VecRNN, and dyngraph2 VecAE, respectively (i.e., the models 300, 320, 340). Compared to the conventional rerunSVD model, the presently described models dyngraph2 VecAERNN (with lookback=10), dyngraph2 VecRNN (with lookback=10), and dyngraph2 VecAE (with lookback=5) obtain ≈137%, 95%, and ≈74% higher average MAP values, respectively.

These results, as depicted in FIGS. 6A-6C, show that the models 300, 320, 340 are able to capture graph dynamics better than conventional models.

One of the parameters for time-series analysis is how much in the past the method looks to predict the future. To analyze the effect of look back on the MAP score, trained the dyngraph2 vec models 300, 320, 340 are trained with various lookback values. The embedding dimension is fixed to 128. The lookback size is varied from 1 to 10 and the change in MAP values with the real world datasets AS and Hep-th is tested.

Figure 6D:
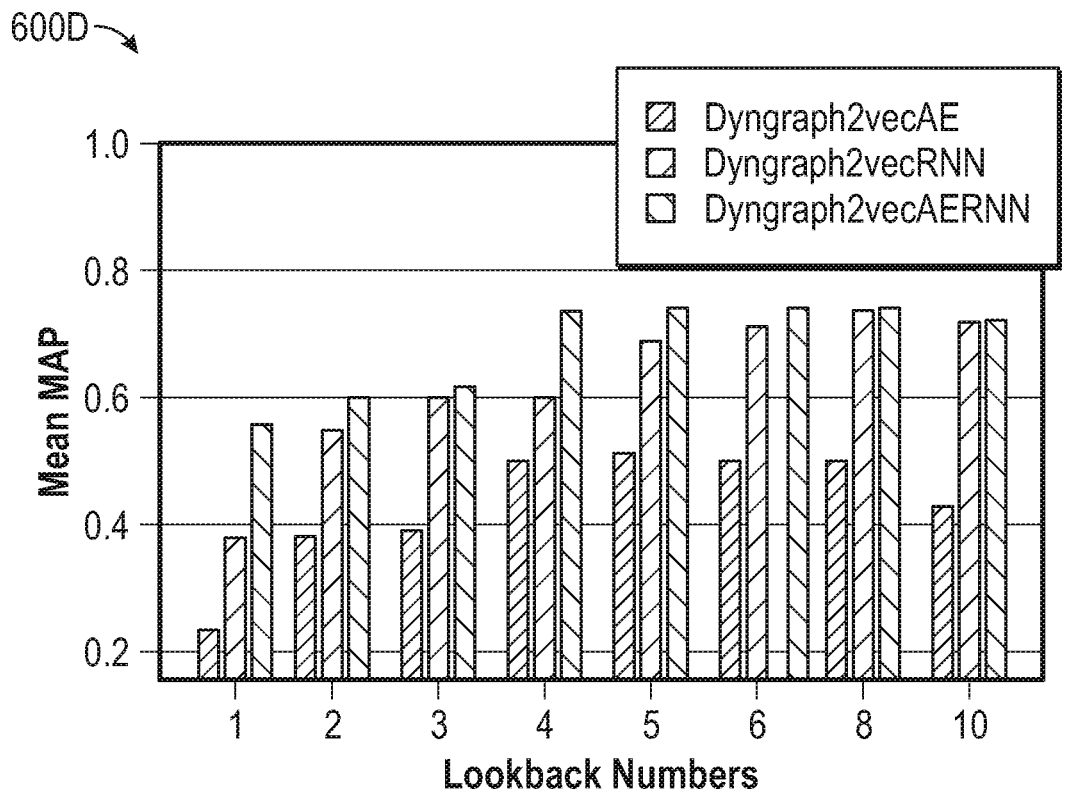
FIGS. 6D and 6E depict plots of mean average precision plotted against lookback numbers for the dynamic graph encoding models of FIGS. 3A-3C according to one or more embodiments described herein.

FIG. 6D depicts a plot 600D of MAP values for various lookback numbers for the HEP-th dataset. It should be appreciated from the plot 600D that increasing lookback values consistently increases the average MAP values. Moreover, it should be observed that that dyngraph2 vecAE model 300 although has increased in performance until lookback size of 8, and then its performance is decreased for lookback value of 10. Since it does not have memory units to store the temporal patterns like the recurrent variations, it relies solely on the fully connected dense layers to encode to the pattern. The highest MAP values achieved by dyngraph2 vecAERNN (i.e., the model 340) is 0.739 for the lookback size of 8.

Figure 6E:
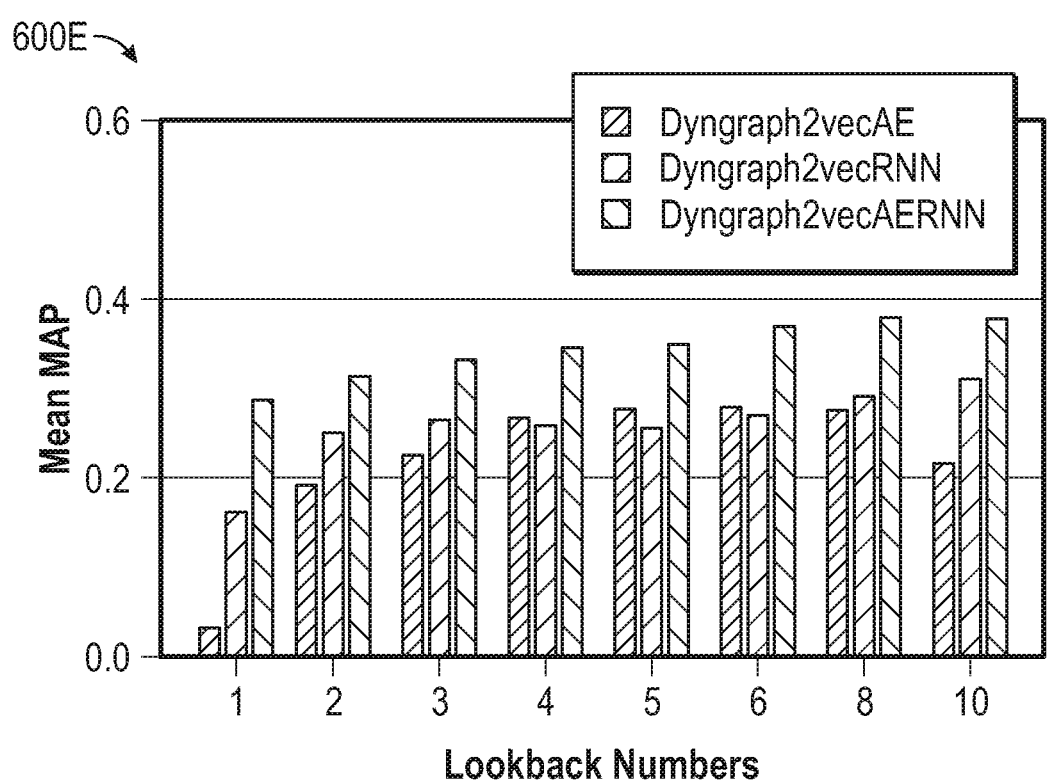

FIG. 6E depicts a plot 600E of MAP values for various lookback numbers for the AS dataset. The average MAP values also increase with the increasing lookback size in the AS dataset. The highest MAP value of 0.3801 is again achieved by dyngraph2 vecAERNN (i.e., the model 340) with the lookback size of 10. The dyngraph2 vecAE model (i.e., the model 300), initially, has comparable and sometimes even higher MAP value with respect to dyngraph2 vecRNN. However, it can be observed that for the lookback size of 10, the dyngraph2 vecRNN (i.e., the model 320) outperforms dyngraph2 vecAE model having the fully connected neural networks. In fact, the MAP value does not increase after the lookback size of 5 for dyngraph2 vecAE as shown.

The length of graph sequence supplied to the models during training can also impact is performance according to one or more embodiments described herein. As an example, in order to conduct this experiment, the graph sequence provided as training data is increased one step at a time. Hence, the graph sequence of length 1 to $t \in [T, T+1, T+2, T+3, \ldots, T+n]$ is used to predict the links for graph at time step $t \in [T+1, T+2, \ldots, T+n+1]$, where T≥lookback. The experiment is performed on Hep-th and AS dataset with a fixed lookback size of 8. The total sequence of data is 50 and it is split between 25 for training and 25 for testing. Hence, in the experiment, the training data sequence increases from total of 25 sequence to 49 graph sequence. The resulting plots 600F and 600G in FIGS. 6F and 6G respectively show the average MAP values for predicting the links starting the graph sequence beginning at the $26^{th}$ time step and continuing to the $50^{th}$ time step. In this example, each time step represents one month.

Figure 6F:
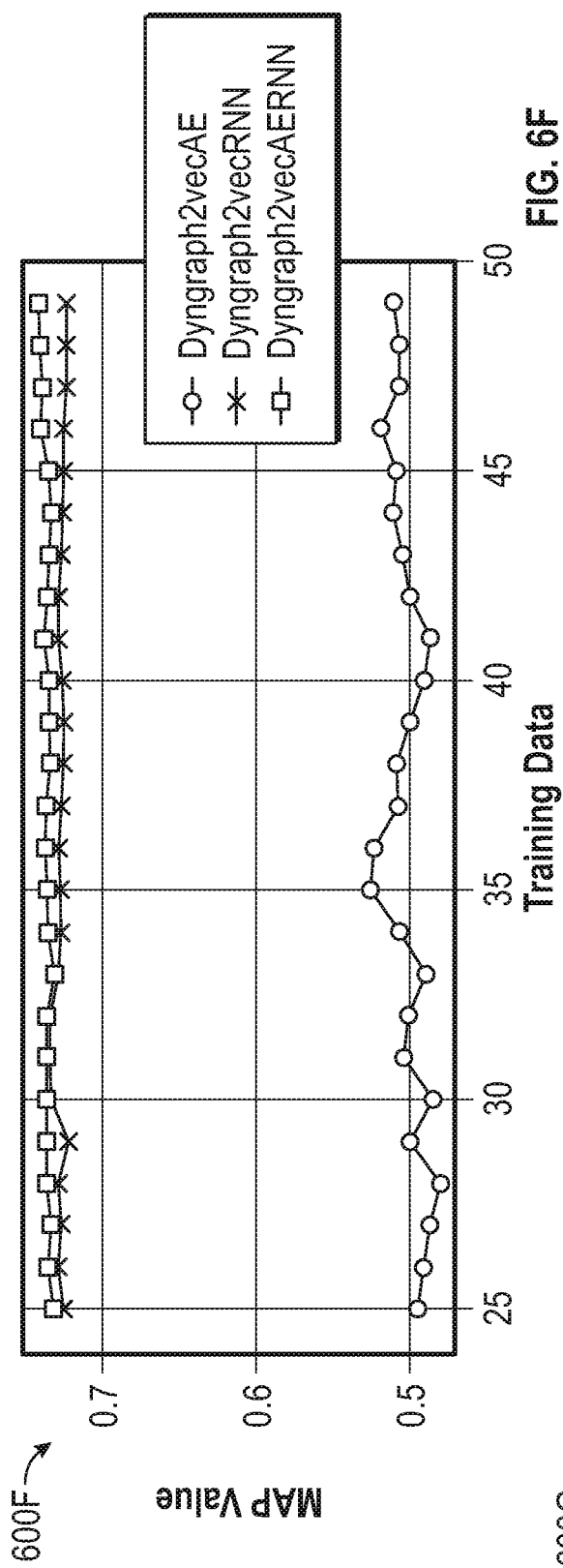
FIGS. 6F and 6G depict plots of mean average precision plotted against training data for the dynamic graph encoding models of FIGS. 3A-3C according to one or more embodiments described herein.

The plot 600F of FIG. 6F depicts the results of increasing the amount of graph sequence in training data for the Hep-th dataset. It can be observed that for both the models 320 and 340, the increasing amount of graph sequence in the data increases the MAP value. For the model 300, there is an increase in the MAP value as the graph sequence increases.

Figure 6G:
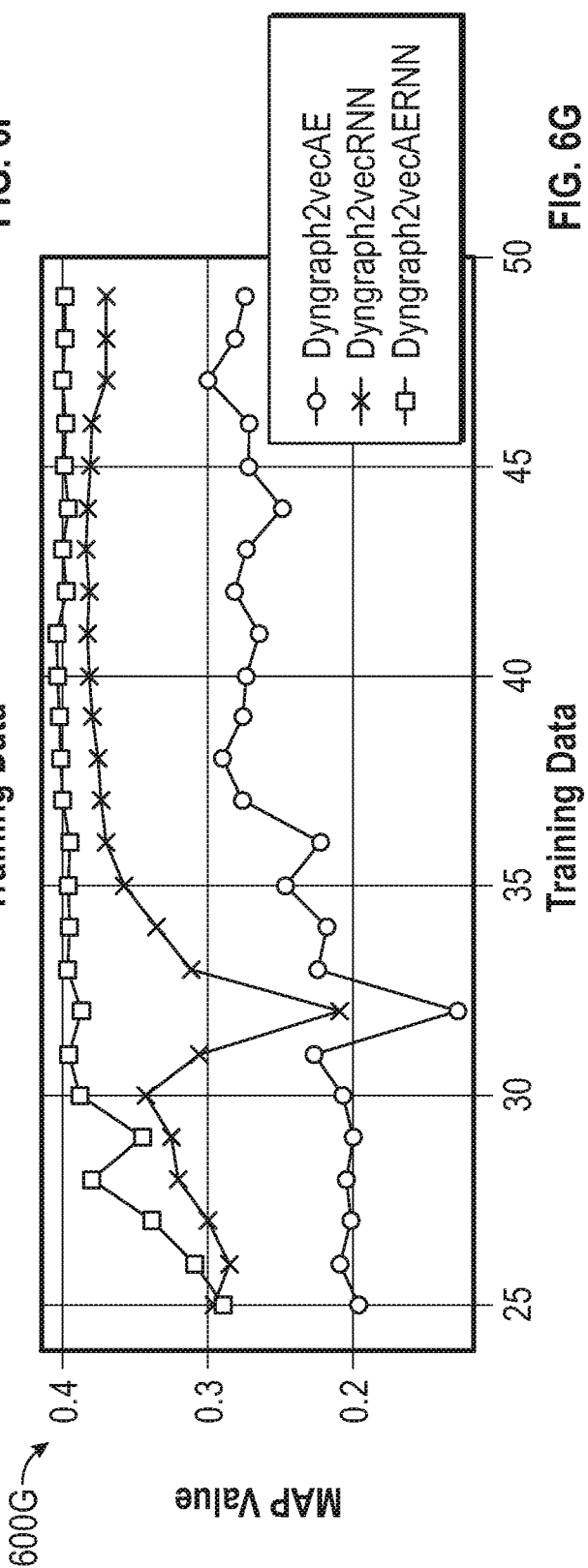

The plot 600G of FIG. 6G depicts the results of increasing the amount of graph sequence in training data for the AS dataset. In this example, increasing the amount of graph sequence for the AS dataset during training results in a gradual improvement in link prediction performance.

As can be appreciated from the foregoing, example embodiments of the disclosure include or yield various technical features, technical effects, and/or improvements to technology. In particular, example embodiments of the disclosure provide for improved dynamic graph representation learning for capturing network dynamics. To do this, embodiments described herein use different models for dynamic graph representation learning that represent improvements over conventional approaches for static and dynamic graph representation learning. These models include the dyngraph2 vecAE, dyngraph2 vecRNN, and dyngraph2 vecAERNN models depicted in FIGS. 3A, 3B, and 3C respectively. These aspects of the disclosure constitute technical features that yield the technical effect of capturing network dynamics using dynamic graph representation learning. It should be appreciated that the above examples of technical features, technical effects, and improvements to technology of example embodiments of the disclosure are merely illustrative and not exhaustive.

Figure 7:
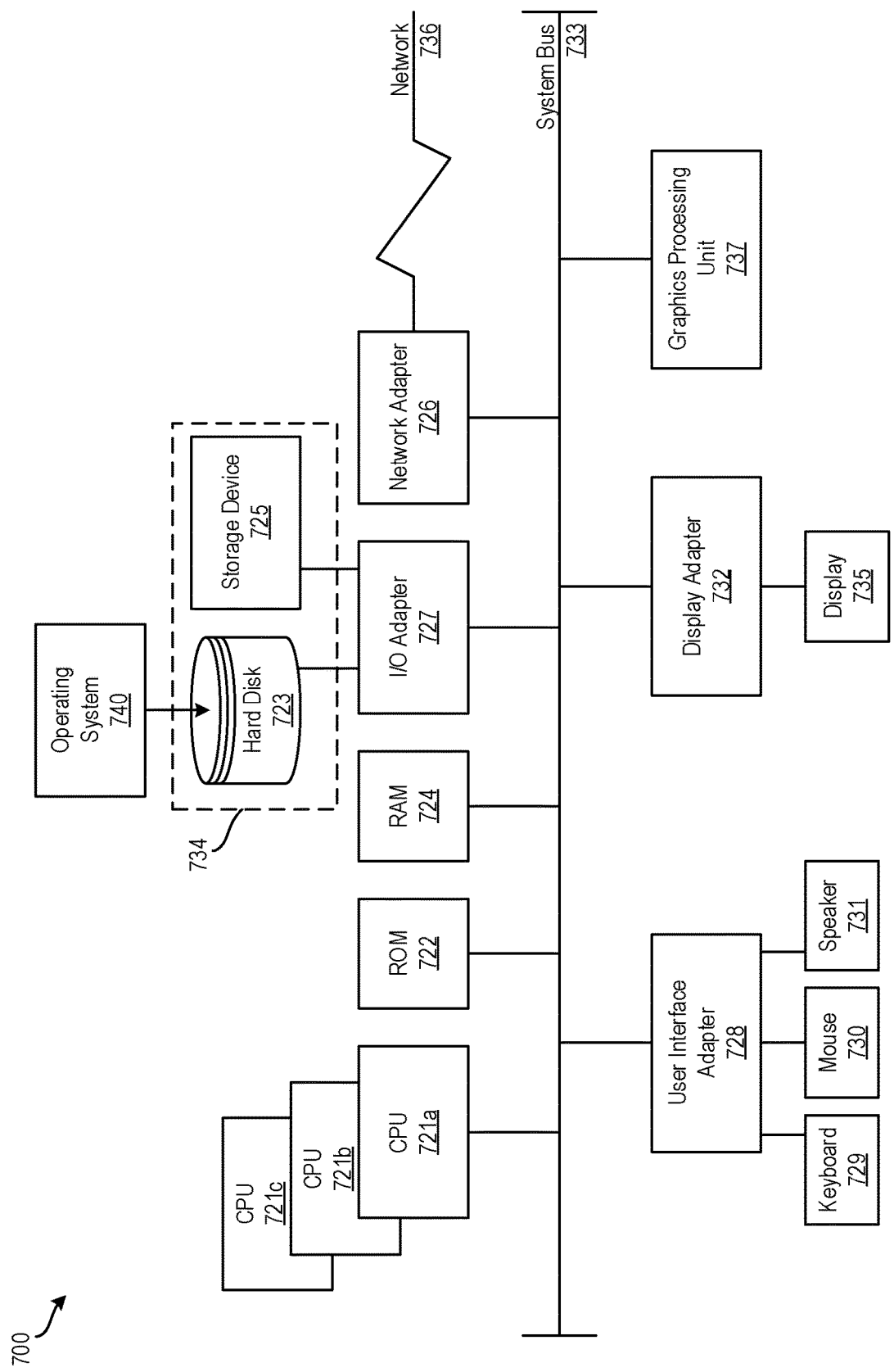
FIG. 7 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 7 depicts a block diagram of a processing system 700 for implementing the techniques described herein. In accordance with one or more embodiments of the present invention, the processing system 700 is an example of a node of a cloud computing environment. In examples, processing system 700 has one or more central processing units ("processors" or "processing resources") 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for link prediction of a dynamic network, the method comprising:

generating a dynamic graph embedding model for capturing temporal patterns of dynamic graphs, each of the graphs being an evolved representation of the dynamic network over time steps for a temporal lookback period and having a set of vertices and edges, the edges representing network links, the temporal patterns including nonlinear interactions between graph vertices at each time step and across multiple time steps, wherein the dynamic graph embedding model is configured as a neural network modeled as an autoencoder-recurrent neural network combination using fully connected dense layers as a first part of an encoder of the neural network to generate a low dimensional vector representation of a sparse neighborhood vector of the evolved dynamic graphs, and using layers of long short term memory networks as a second part of an encoder of the neural network to generate the embedding from the low dimensional vector representation;

learning structural patterns in the dynamic network using the nonlinear layers;

learning, by the dynamic graph embedding model, a dynamic graph embedding for the temporal lookback period by optimizing a loss function that includes a weighting matrix for weighting reconstruction of observed edges higher than unobserved links, wherein the network embedding is a representation of each of the vertices in a series of low-dimensional vector space; and predicting edges at a future time step based on parameters of the neural network, wherein the parameters are tuned by optimizing the loss function.

2. The computer-implemented method of claim 1, wherein the weighting matrix includes a hyperparameter for controlling weight of penalizing observed edges.

3. The computer-implemented method of claim 1, wherein the predicted edges include at least one edge representation of an unobserved network link.

4. The computer-implemented method of claim 1, further comprising:

receiving, by the dynamic graph embedding model, inputs as a set of previous dynamic graphs for the temporal lookback period, the lookback period being used to control a length of temporal patterns learned; and decoding the dynamic graph embedding to produce the output of the dynamic graph embedding model, wherein the output is a predicted graph for the next time step.

5. The computer-implemented method of claim 1, wherein the long short term memory networks are sparsely connected, and wherein l long short term memory networks are connected in the first layer of the neural network, where l is the number of previous graphs for the temporal lookback period.

6. The computer-implemented method of claim 1, further comprising:

using fully connected layers as a decoder for the neural network; and decoding, by the decoder, the dynamic graph embedding to produce the output of the dynamic graph embedding model, wherein the output is a predicted graph for the next time step.

7. A system comprising:

a memory comprising computer readable instructions; and a processing device for executing the computer readable instructions for executing steps of link prediction of a dynamic network, the steps comprising:

generating a dynamic graph embedding model for capturing temporal patterns of dynamic graphs, each of the graphs being an evolved representation of the dynamic network over time steps for a temporal lookback period and having a set of vertices and edges, the edges representing network links, the temporal patterns including nonlinear interactions between graph vertices at each time step and across multiple time steps, wherein the dynamic graph embedding model is configured as a neural network modeled as an autoencoder-recurrent neural network combination comprising:

an encoder comprising:

a first encoder part having fully connected dense layers to generate a low dimensional vector representation of a sparse neighborhood vector of the evolved dynamic graphs; and a second encoder part having layers of long short term memory networks to generate the embedding from the low dimensional vector representation;

learning structural patterns in the dynamic network using the nonlinear layers;

learning, by the dynamic graph embedding model, a dynamic graph embedding for the temporal lookback period by optimizing a loss function that includes a weighting matrix for weighting reconstruction of observed edges higher than unobserved links, wherein the network embedding is a representation of each of the vertices in a series of low-dimensional vector space; and predicting edges at a future time step based on parameters of the neural network, wherein the parameters are tuned by optimizing the loss function.

8. The system of claim 7, wherein the predicted edges include at least one edge representation of an unobserved network link.

9. The system of claim 7, wherein the steps further comprise:

receiving, by the dynamic graph embedding model, inputs as a set of previous dynamic graphs for the temporal lookback period, the lookback period being used to control a length of temporal patterns learned; and decoding the dynamic graph embedding to produce the output of the dynamic graph embedding model, wherein the output is a predicted graph for the next time step.

10. The system of claim 7, wherein the long short term memory networks are sparsely connected, and wherein l long short term memory networks are connected in a first layer of the neural network, where l is the number of previous graphs for the temporal lookback period.

11. The system of claim 7, wherein the neural network further comprises a decoder having fully connected layers for decoding the embedding to produce the output of the dynamic graph embedding model, wherein the output is a predicted graph for the next time step.

* * * * *